Feb. 6, 1973   T. R. GRIFFIN   3,715,105
HOMOGENISING
Filed Jan. 5, 1970

Inventor
THOMAS REUBEN GRIFFIN
By
Cushman, Darby & Cushman
Attorneys

United States Patent Office 3,715,105
Patented Feb. 6, 1973

3,715,105
HOMOGENISING
Thomas Reuben Griffin, Pontypool, England, assignor to Imperial Chemical Industries Limited, London, England
Filed Jan. 5, 1970, Ser. No. 1,072
Claims priority, application Great Britain, Jan. 10, 1969, 1,664/69
Int. Cl. B01f 15/02
U.S. Cl. 259—2
3 Claims

ABSTRACT OF THE DISCLOSURE

Process and apparatus whereby a mixture comprising a liquid is sheared and homogenised by passing it through dimensionally precisely pre-defined paths arranged in a parallel system which paths include dimensionally precisely pre-defined narrow sections and wherein the walls of said narrow sections are in controlled relative movement one with the other.

---

The present invention concerns the production of homogeneous mixtures and in particular, but not exclusively, of homogeneous melts of synthetic linear polymers.

The present invention will be particularly described but not limitatively, with reference to the production of homogeneous melts of synthetic linear polymers, such as Nylon 66, for melt-spinning.

Synthetic polymers have been produced from monomers for many years. In theory the monomers are thoroughly mixed and polymerised, usually by heating, to produce a polymer mass which is perfectly homogeneous with regard to properties such as molecular weight, viscosity, dispersion of pigments, additives and the like.

In practice such perfect homogeneity is not produced, the polymer mass containing regions of greater or lesser viscosity or molecular weight, excessively cross linked areas (lumps of gel), agglomerates of insoluble additive, bubbles, dirt and the like.

Particularly when the resulting polymers are to be melt extruded through fine orifices, for instance to produce filaments, it will readily be appreciated that such non-homogeneities may cause blocking of parts of the apparatus or, if they finally get through the apparatus, will constitute points of weakness in said filaments, which may break when stressed, or may produce a mottled effect when such filaments are dyed, etc.

Numerous suggestions have been put forward for the homogenising of such polymers, in melt or solution form, including passage through granular material which breaks up some non-homogeneities and filters out others, and passage through apparatus comprising fine spaces, such as those between an inner rotating member and the wall of the vessel in which it rotates. Such previous apparatus has been designed to conduct the material through one narrow space after another i.e. in a "series" system. With such a system, if blockage due to non-homogeneities has built up at any point in the path of the material through the system such blockage tends to increase and may produce undesirable back pressures, tending to overload for instance the drive to a rotating member or to stop the member entirely. Alternatively the non-homogeneities may finally be forced or carried through the apparatus, thus vitiating its function.

In any case, even with relatively good quality material to be homogenised, with a single narrow shear-passage or several such passages in series, one falls into the difficulty that such passage or passages must be suitably narrow to obtain the required homogenising action, whilst they must also be long enough to give time for the material flowing through them to become homogeneous. In practice it is very difficult to fulfill both of these stipulations without causing a large pressure change across such passage or passages and this may cause an undesirable fall in output from the homogeniser or excessive back pressures.

Applicants have now devised a simple but ingenious means whereby such difficulties are largely overcome.

One form of apparatus, called hereinafter embodiment 1, for practicing the present invention, and its operation will now be described with reference to the accompanying drawings, where:

Figure 1:
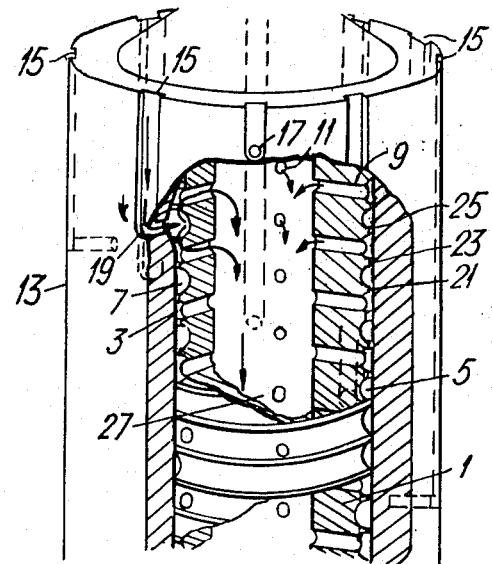
FIG. 1 is a cut-away perspective view of part of said apparatus.

Said one form of apparatus is constituted essentially as follows. A hollow tube 1 has annular channels, e.g. 3, 5, 7, in its outer wall. In said hollow tube holes such as 9, 11 communicate between the inside of said hollow tube and alternate annular channels on the outside of said hollow tube.

Said hollow tube fits snugly inside a second hollow tube 13. Said second tube 13 has a grooved outer wall, the grooves forming open channels 15, of different length, extending parallel with the axis of tube 13. In said second hollow tube holes such as 17, 19 communicate between the inside of the tube and ends of said parallel extending open channels.

The whole assembly fits snugly into a third hollow tube (not shown in figures) in such a way that aforesaid parallel extending open channels are converted to closed channels. Said closed channels extend by various lengths from one end of the second hollow tube to meet holes such as 17, 19, all said channels opening at said one end.

Said first hollow tube, with annular wall channels, is fitted into the second hollow tube in such a way that the holes in the second hollow tube, such as 17, 19 communicate with alternate annular channels in the first hollow tube, which alternate annular channels do not communicate directly with the inside of the first hollow tube.

In operation, molten polymer or other mixture is forced along the aforesaid closed channels from one end of the second hollow tube in the direction of the arrow marked "inflow." Said polymer, or other mixture, is thus forced through holes, such as 17, 19, into the corresponding annular channels on the outside of said first tube, 1. It is then forced to pass both ways, via the small annular gaps, e.g. 21, 23, 25, between the walls of the first and second hollow tubes, into the adjacent alternate annular channels and thence via the holes in such channels, such as 9, 11 into the cylindrical hollow space 27 within hollow tube 1 from whence it is conducted to further processing apparatus such as melt-spinning apparatus. During its passage via the annular gaps, e.g. 21, 23, 25 under pressure, particularly if the inner or outer tubes, 1 and 13 respectively, are moved relative to one another, the molten polymer or other mixture is sheared and non-homogeneities are either broken up or remain in the annular wall channels e.g. 3, 5, 7. After some time these may get broken up to pass through the annular gaps e.g. 21, 23, 25.

In another embodiment, hereinafter known as embodiment 2, of the present invention the parallel extending open channels 15 of the second hollow tube 13 all extend nearly the whole length of said tube. From each of said channels holes similar to 17 and 19 extend to communicate with alternate annular channels the other alternate channels not communicating with such holes. In other words, all the channels 15 communicate with all the annular channels which do not communicate directly with the inside of tube 1.

Figure 3:
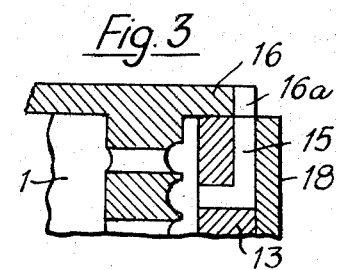
FIG. 3 is a partial sectional view, similar to FIG. 2, showing a modification thereof.

In yet another embodiment, hereinafter known as embodiment 3 and illustrated in FIG. 3, the upper ends of all channels 15 open at the under surface of a solid plate 16 which plate is an integral part of said hollow tube 1 and which plate extends over the whole section of tubes 1 and 13 from its centre to the inner wall of the outer, third hollow tube 18. In said plate 16 there are channels 16a which are continuations of channels 15, opening at the upper surface of said plate. Material fed onto the said plate proceeds down said continuations and thence down channels 15. When the hollow tube 1 is rotated the channels in said plate make sequential contact with the various channels 15. In this way said material is more evenly distributed to the various channels 15 and hence to the various annular channels and the relevant small annular gaps. Said embodiments may be used at any convenient angle.

Figure 2:
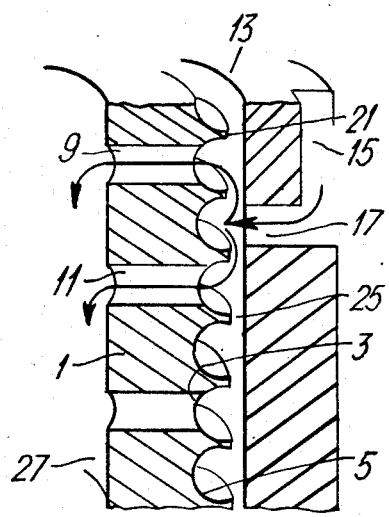
FIG. 2 is a diagrammatic cross section of part of said apparatus.

The apparatus, for instance as illustrated in FIGS. 1 and 2, may be extended to any suitable extent and equipped with any suitable number of channels of suitable dimensions and shape. Should one of the channels become completely blocked, for instance, the molten polymer or other mixture by-passes this channel and flows through others. Later, said blocked channel may become unblocked by the process described; if not, the blocking non-homogeneity is retained and prevented from entering hollow space 27.

Furthermore, said annular channels may, of course, be located in the inner surface of the outer hollow tube 13, the inner hollow tube 1 having a plane outer surface, or both may have annular channels, or there may be any other configuration of the aforesaid apparatus parameters so long as the apparatus encompasses the objects of the invention.

Another possible modification of the above described apparatus is that the assembly of first and second tubes need not fit snugly into the third tube. The inner wall of said third tube may be suitably spaced from the outer wall of said second tube and the grooves in said outer wall may be dispensed with if necessary or convenient.

One aspect of the present invention, therefore, provides a process whereby a mixture comprising a liquid in sheared and homogenised by-passing it through dimensionally precisely pre-defined paths arranged in a parallel system which paths include dimensionally precisely pre-defined narrow sections and wherein the walls of said narrow sections are in controlled relative movement one with the other.

Another aspect of the present invention comprises apparatus for carrying out the afore-defined process.

When the walls of said narrow sections are in relative movement this follows preferably a path which is substantially parallel with at least one of said walls.

In the case of embodiment 1, for instance, said motion may be caused by rotation of the first hollow tube 1 within a stationary second hollow tube 13 or said tube 1 may be reciprocated along its axis at any desired frequency.

Of course different relative motions may be found best for dealing with different mixtures.

If the desired degree of homogeneity is not obtained at the exit of the apparatus, the molten polymer or other mixture may be fed to a further similar apparatus, which may, of course, be integral with the first. Alternatively part of the out-flowing liquid may be re-fed to the apparatus.

The actual defined dimensions and shapes of the various apparatus parts, such as channel and gap shape and size will vary, of course, with the use to which said apparatus is put. For dealing with molten synthetic linear polymer for melt spinning, using the particular form of apparatus hereinbefore described, suitable dimensions are:

| | |
|---|---|
| Outside diameter of second hollow tube 13 | 11/16". |
| Inside diameter of second hollow tube 13 | 1/2". |
| Length diameter of second hollow tube 13 | 1.29". |
| No. of channels, 15, on second hollow tube 13 | 8 (0.1" wide and 0.5" deep). |
| Diameter of holes, e.g. 17, 19 | 0.04". |
| Inside diameter of first hollow tube 1 | 1/4". |
| Length of first hollow tube 1 | 2". |
| No. of annular channels e.g. 3, 5, 7 on first hollow tube 1 | 16 (0.06" deep and 0.025" radius). |
| Spacing of annular channels i.e. length of gaps e.g. 21, 23, 25 | 0.058". |
| Width of gaps i.e. spacing between walls | 0.00125. |

Apparatus of embodiment 1 with the aforesaid suitable dimensions is hereinafter called embodiment 1A.

While the above apparatus has been described particularly with reference to the production of homogeneous melts of synthetic linear polymers for melt-spinning, it is clear that with suitable selection of apparatus materials and dimensions said apparatus could be used for homogenising numerous other materials such as pigment slurries, paints, lacquers, cosmetics and the like.

Furthermore, apparatus of the present invention may form an integral part of any other apparatus such as a spinning-head assembly or a pump. The material to be homogenised may of course, be passed through the apparatus in the opposite sense to that herein described, if this is more convenient.

EXAMPLE 1

Gas bubbles (nitrogen) were introduced into the flow of molten Nylon 66 polymer at a point before the meter-pump feeding the extrusion pack and spinneret in melt spinning apparatus. The polymer was extruded through a slot 2" long and 0.010" wide and was water-quenched to produced a thin film in which any gas bubbles present could be seen. The meter pump used was of a conventional gear-meshing type.

After a time a combined pump-homogeniser assembly comprising an homogenising apparatus according to embodiment 1A, having the aforesaid dimensions and fitted downstream of the meter pump was substituted for the conventional meter pump. With the conventional meter pump alone, streaks of elongated bubbles were seen in the tape, while with the pump-homogeniser assembly the tape showed hardly any sign of bubbles and only a slight uniform milkiness. No significant difference in dimensions of the extruded tape were seen over extended periods of spinning, indicating that the homogenising apparatus of the present invention was not giving rise to any significant pressure change.

EXAMPLE 2

A similar experiment to that of Example 1 was carried out but in this case a stream of green-pigmented polypropylene was injected instead of nitrogen bubbles into a flow of molten polypropylene extruded through a hole to form a filament. Sections of such filaments were examined microscopically to determine the degree of dispersion. The degree of dispersion of the pigment obtained with the combined meter-pump/homogeniser was very much better, being free from pigment streaks. At the same time no difficulty with excessive pressure due to the homogeniser were met with during spinning.

EXAMPLE 3

Experiment 1 was repeated but a stream of identical 66 Nylon containing 10% Cadmium red pigment was fed into the main flow of polymer before the meter pump in such amount as to give a pigment level in the final tape of about 0.25%. The dispersion of the pigment with the homogenising apparatus of the present invention was very much better and, as before, no trouble from excessive pressure was met with.

What I claim is:

1. An improved apparatus wherewith a mixture comprising a liquid is sheared and homogenised, the improvement consisting in said apparatus having dimensionally precisely pre-defined paths arranged in a parallel system which paths include dimensionally precisely pre-defined narrow sections and wherein the walls of said narrow sections are capable of controlled relative movement one with the other, the structure which defines said paths comprising an inner tube disposed concentrically within an outer tube, one of said tubes having annular channels in its wall whereby the space between the tubes is divided into a plurality of annular channels separated from each other by said dimensionally precisely pre-defined narrow sections, said paths being further defined by holes in the wall of the outer tube which communicate with some of the annular channels and by holes in the wall of the inner tube which extend between other annular channels and the bore of the inner tube, said inner and outer tubes being mounted for relative movement therebetween.

2. Apparatus as in claim 1 wherein said inner and outer tubes are mounted for relative rotational movement.

3. Apparatus as in claim 1 wherein said inner and outer tubes are mounted for relative axial movement.

References Cited

UNITED STATES PATENTS

| 2,559,516 | 7/1951 | Russell | 259—9 |
| 2,734,728 | 2/1956 | Myers | 259—5 |
| 2,995,346 | 8/1961 | Samples | 259—8 |
| 3,328,003 | 6/1967 | Chisholm | 259—4 |
| 3,459,407 | 8/1969 | Hazlehurst | 259—4 |
| 3,476,521 | 11/1969 | Wise | 259—4 X |

ROBERT W. JENKINS, Primary Examiner